United States Patent [19]
Iftikar et al.

[11] Patent Number: 6,028,736
[45] Date of Patent: *Feb. 22, 2000

[54] LOCATION AND CENTERING OF A DIGITAL VIDEO CARTRIDGE WITHIN A DISK DRIVE

[75] Inventors: Syed H. Iftikar, Pleasanton; Albert Guerini, Gilroy; Hong Khuu, Fremont, all of Calif.

[73] Assignee: Castlewood Systems, Inc., Pleasanton, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/970,491
[22] Filed: Nov. 14, 1997
[51] Int. Cl.⁷ .................................................. G11B 17/03
[52] U.S. Cl. ......................................................... 360/99.06
[58] Field of Search ............................ 360/99.06, 99.02; 369/77.2

[56] References Cited

U.S. PATENT DOCUMENTS

| | | | |
|---|---|---|---|
| D. 339,798 | 9/1993 | Tannert et al. | D14/114 |
| D. 350,115 | 8/1994 | Iftikar et al. | D14/114 |
| 4,434,480 | 2/1984 | Fukumitsu | 369/77.2 |
| 4,503,474 | 3/1985 | Nigam | 360/133 |
| 4,562,498 | 12/1985 | Shibata | 360/99.02 |
| 4,603,362 | 7/1986 | Sendelweck | 360/99.06 |
| 4,656,542 | 4/1987 | Shibata | 360/99.06 |
| 4,660,111 | 4/1987 | Morimoto | 360/99.02 |
| 4,717,981 | 1/1988 | Nigam et al. | 360/133 |
| 4,864,452 | 9/1989 | Thompson et al. | 360/133 |
| 4,870,518 | 9/1989 | Thompson et al. | 360/99.06 |
| 4,878,139 | 10/1989 | Hasegawa et al. | 360/99.06 |
| 4,890,276 | 12/1989 | Ono et al. | 369/77.2 |
| 4,965,691 | 10/1990 | Iftikar et al. | 360/133 |
| 4,974,103 | 11/1990 | Iftikar et al. | 360/97.01 |
| 5,088,085 | 2/1992 | Uehara | 360/99.06 |
| 5,140,478 | 8/1992 | Yoshida | 360/99.06 |
| 5,204,793 | 4/1993 | Plonczak | 360/99.06 |
| 5,218,503 | 6/1993 | Martin | 360/133 |
| 5,262,918 | 11/1993 | Tannert | 360/133 |
| 5,317,464 | 5/1994 | Witt et al. | 360/99.08 |
| 5,422,775 | 6/1995 | Martin | 360/133 |
| 5,440,436 | 8/1995 | Iftikar et al. | 360/99.12 |
| 5,444,586 | 8/1995 | Iftikar et al. | 360/99.12 |
| 5,485,330 | 1/1996 | Hirose et al. | 360/99.06 |
| 5,506,828 | 4/1996 | Kanno et al. | 360/99.06 |
| 5,530,607 | 6/1996 | Spendlove | 360/105 |
| 5,570,252 | 10/1996 | Sumner et al. | 360/99.06 |
| 5,587,856 | 12/1996 | Aoyama | 360/99.06 |
| 5,617,397 | 4/1997 | Jones et al. | 369/772 |
| 5,809,520 | 9/1998 | Edwards et al. | 360/97.01 |

*Primary Examiner*—Craig A. Renner
*Attorney, Agent, or Firm*—Townsend and Townsend and Crew LLP

[57] ABSTRACT

A disk drive has a support structure for maintaining alignment between a removable hard disk cartridge and the disk drive. Particularly, the disk drive and support structure are for use with recording and archiving digital video and other data. The support structure makes use of a series of engagable surfaces on both the cartridge and drive. These fixed surfaces can fully determine the position of the cartridge within the drive so as to avoid interference of the cartridge housing with the rotating disk, movable head support structures, and the like. Preferably, alternative insertion surfaces may be provided on the cartridge and disk drive housings to slidingly engage each other during manual insertion of the cartridge so as to promote normal engagement and disengagement of the spindle drive and disk hub structures.

14 Claims, 10 Drawing Sheets

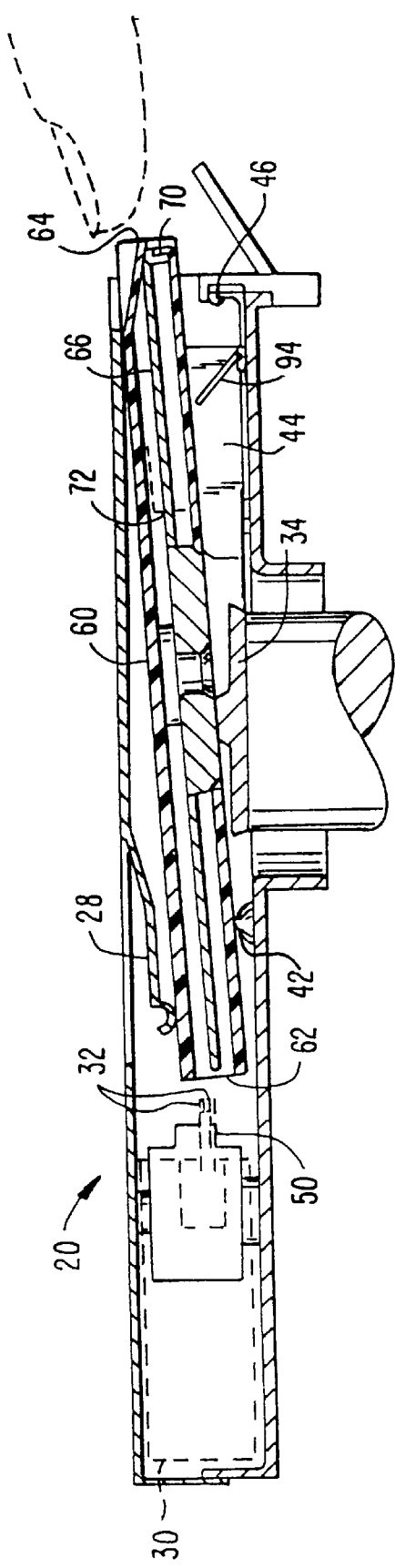
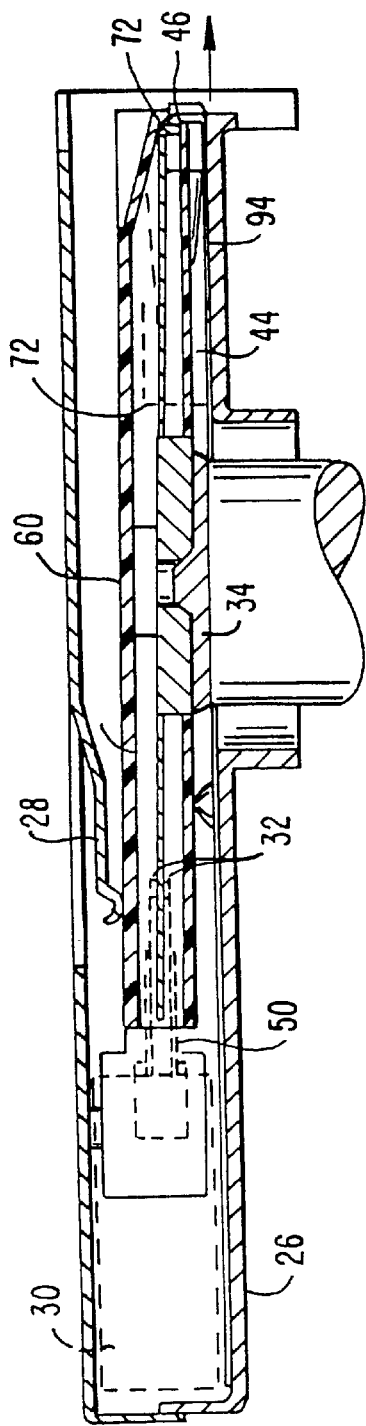
FIG. 6B.
FIG. 7A.

LOCATION AND CENTERING OF A DIGITAL VIDEO CARTRIDGE WITHIN A DISK DRIVE

BACKGROUND OF THE INVENTION

The present invention is generally related to recording systems for digital video and other data, and in particular, provides structures and methods for positioning a hard disk cartridge within a disk drive, especially for manually inserting the cartridge into the drive.

Video Cassette Recorders ("VCRs") dominate the consumer video market, due in part to their combination of low cost and recording capabilities. VCR analog magnetic tape recording cassettes can be used to record, play-back, and store video images in a format which is well adapted for use with existing analog television signals. The ability to record allows consumers to use the standard VHS VCR to save television shows and home movies, as well as for play-back of feature films.

The structure of VCR systems and recording media are adapted to record and archive existing television signals. Specifically, a large amount of analog data is presented on a standard television screen during a standard length feature film. VCR systems record this analog data using analog recording media. The VCR recordings can be removed from the recording/play-back equipment for storage, thereby minimizing the system costs when large numbers of movies are stored.

While VCR systems successfully provide recording and archive capabilities at low cost, these existing consumer video systems have significant disadvantages. For example, accessing selected portions of a movie stored on a VCR tape can be quite slow. In particular, the cassette must be rewound to the beginning of the movie between each showing, which can involve a considerable delay. Additionally, transferring data to and from the tape takes a substantial amount of time. Although it would be beneficial to provide high speed accessing and transfer of the video data, this has remained a secondary consideration, as movies are typically recorded and played by the consumer in real time. Alternatives providing faster access are commercially available (for example, optical video disks), but these alternatives generally have not been able to overcome the VCR's low cost and recording capabilities.

Recent developments in video technology may further decrease the VCR's advantages over alternative systems. Specifically, standard protocols have recently been established for High Definition TeleVision ("HDTV") signals. The digital data presented in a single HDTV feature film using these protocols can represent a substantial increase over existing VCR system capacities. While digital video cassette tapes are available, these modified versions of existing analog VCR systems do not appear to have sufficient storage capacity for a feature film in all of the proposed HDTV formats. Optical disks can accommodate these larger quantities of digital data. Unfortunately, despite many years of development, a successful low cost optical recording system has remained an elusive goal.

Personal computer magnetic data storage systems have evolved with structures which are quite different than consumer video storage systems. Modern personal computers often include a rigid magnetic disk which is fixed in an associated disk drive. These hard disk drive systems are adapted to access and transfer data to and from a recording surface of the disk at high speeds. It is generally advantageous to increase the total data storage capacity of each hard disk, as the disks themselves are typically fixed in the drive system. Hence, much of the data that is commonly used by the computer is stored on a single disk.

The simplicity provided by such a fixed disk drive system helps maintain overall system reliability, and also helps reduce the overall storage system costs. Nonetheless, removable hard disk cartridge systems have recently become commercially available, and are now gaining some acceptance. While considerable computer data can be stored using these removable hard disk cartridge systems, their complexity, less than ideal reliability, and cost has limited their use to selected numbers of high-end personal computer users.

One particular disadvantage of known removable hard disk computer storage systems is the complexity of the structure used to align the removable cartridge with the surrounding disk drive. The disk generally spins within the cartridge, and a data transfer head of the drive is selectively positioned along the recording surface of the rotating disk. To engage and hold the cartridge housing with sufficient accuracy to accommodate these moving parts, known removable disk drive housing generally incorporate complex pins, cams, or other actuated support structures. The disk is often rotated by a spindle drive member which has to translate axially to engage a hub of the disk, further complicating the drive mechanism. Not only do these movable structures increase the complexity and cost of the disk drive system, failure of the actuation mechanisms could result in misalignment of the cartridge and housing. Such failures may decrease the overall reliability of the system, and may also result in damage to the disk drive components, or to the recording media.

In light of the above, it would be desirable to provide improved data storage systems, devices, and methods for storing video and other data. It would be particularly desirable if these improved systems, devices and methods were adapted for digital video data such as the new HDTV protocols, and had the ability to record, archive, and access digital feature films with good reliability and at a low system cost. It would be especially desirable to provide alternative cartridge positioning and support structures capable of providing the desired alignment between the cartridge and the associated disk drive, but without having to resort to the complex actuated holding mechanisms of known removable hard disk drives.

SUMMARY OF THE INVENTION

The present invention provides an improved support structure for maintaining alignment between a removable hard disk cartridge and an associated disk drive, particularly for use in recording and archiving of digital video and other data. In contrast to the complex actuated cartridge support and positioning structures of known removable hard disk systems, the present invention makes use of a series of fixed engageable surfaces on both the cartridge and drive. These simple fixed surfaces can fully constrain the position of the cartridge within the drive so as to avoid interference of the cartridge housing with the rotating disk, movable head support structures, and the like. Ideally, insertion surfaces may also be provided on the cartridge and disk drive housings, the insertion surfaces slidingly engaging each other during manual insertion of the cartridge so as to promote normal engagement and disengagement of the spindle drive and disk hub structures, thereby avoiding the added complexity of telescoping spindle drives and the like.

In a first aspect, the present invention provides a system for storing and retrieving digital video and other data. The system comprises a cartridge containing a rigid recording disk. The cartridge has a plurality of positioning surfaces. A housing defines a receptacle which removably receives the cartridge. The receptacle includes a plurality of fixed surfaces which are adapted to engage the positioning surfaces of the cartridge so as to align the cartridge within the receptacle.

In another aspect, the present invention provides a disk drive for use with a cartridge. The cartridge contains a rigid recording disk, and has a plurality of positioning surfaces. The disk drive comprises a housing defining a receptacle which removably receives the cartridge. The receptacle includes a plurality of fixed positioning surfaces which engage the positioning surfaces of the cartridge so that the cartridge is accurately aligned with the receptacle. A motor has a member which drivingly engages a hub of the disk. The member is adapted to rotate at a fixed position relative to the receptacle.

In another aspect, the present invention provides a method comprising manually inserting a hard disk cartridge into a receptacle of a disk drive by manually overcoming a biasing system of the drive until the cartridge is latched in place. Such a method can provide feedback to the user throughout insertion, and also allows the cartridge to be ejected by simply actuating a latch. Preferably, the disk has a hub and is inserted so that the hub of the disk axially engages an axially fixed drive member of the disk drive. The cartridge can be aligned within the receptacle by engaging surfaces of the cartridge with a plurality of fixed positioning surfaces of the drive, and may be inserted by slidingly engaging fixed insertion surfaces of the drive with the cartridge.

BRIEF DESCRIPTION OF THE DRAWINGS

FIG. 6B is a cross-sectional side view of the cartridge being inserted into the internal drive of FIG. 1B.

FIG. 7A is a cross-sectional side view of the cartridge of FIG. 3 fully inserted into the internal drive of FIG. 1B.

DESCRIPTION OF THE PREFERRED EMBODIMENT

The devices, systems, and methods of the present invention generally make use of low cost, stamped sheet metal support structures in disk drive systems having removable hard disk cartridges. Stamped sheet metal can provide cartridge positioning surfaces, insertion guide surfaces, and component mounting pads (for adjustably mounted components) at a fraction of the cost of a machined disk drive base. The cartridges used with these disk drives will preferably contain a single two-sided rigid magnetic recording disk which is capable of storing at least about 2.4 gigabytes of data, ideally being capable of storing at least about 4.7 gigabytes of data. These devices and methods will find applications for storing a wide variety of data for use with notebook computers, desktop computers, and more powerful computer workstations. The cartridges, the disk drive systems, and the fabrication tools and methods of the present invention are particularly well suited for use in recording, archiving, and playing back digital video data, for fabricating video storage systems. Due to the low cost, large capacity, and archivability provided by the recording system of the present invention, a standard length movie in a format suitable for high definition television ("HDTV") may be stored using no more than two cartridges, and ideally may be stored on a single cartridge having a single, two sided hard disk.

Figure 1:
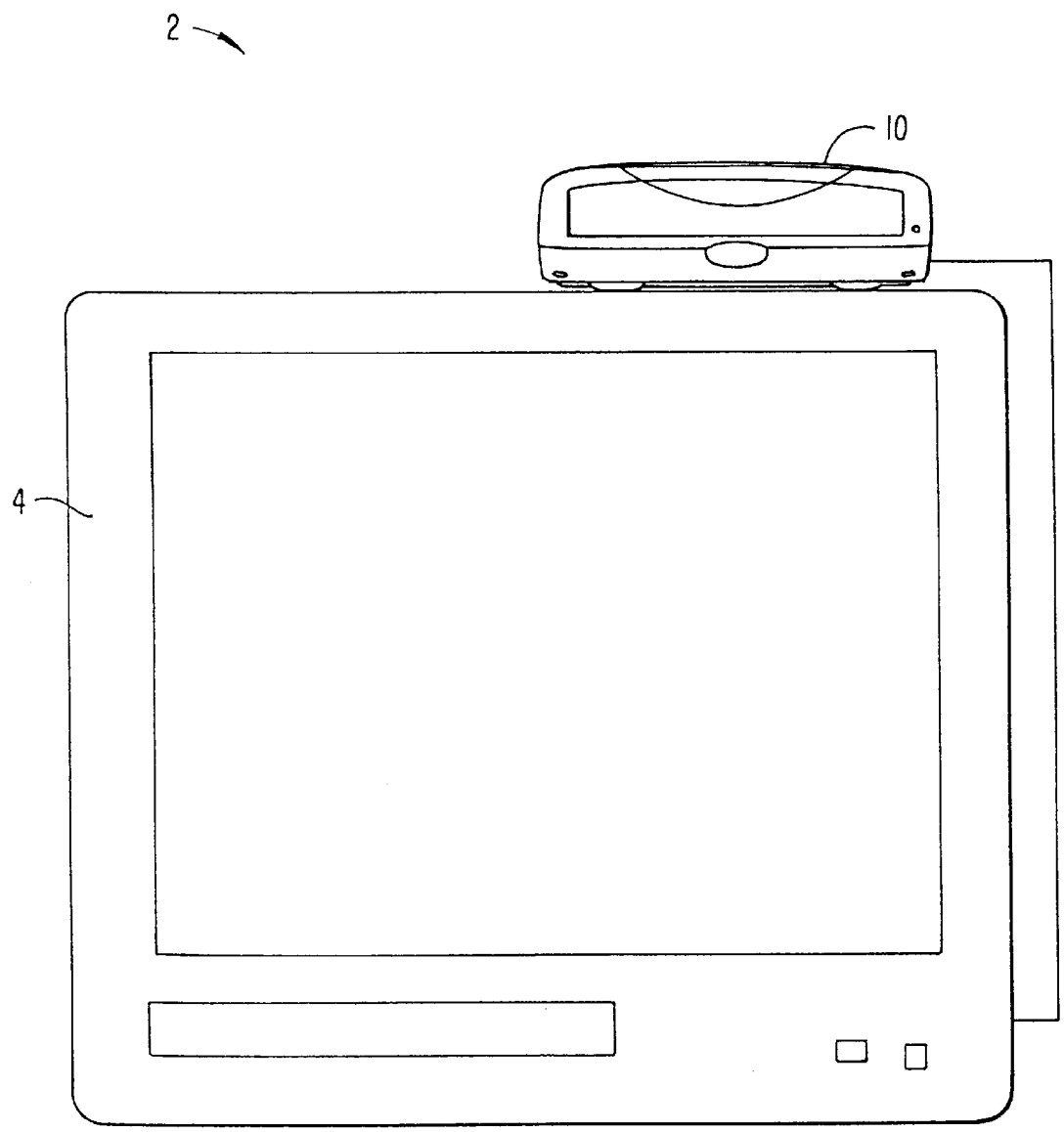
FIG. 1 is a schematic illustration of a video system including a high definition television and an external disk drive.

As schematically illustrated in FIG. 1, a video system 2 includes a high definition television 4 which is coupled to an external disk drive 10. External drive 10 will read recorded digital data from a removable disk cartridge, and will transmit that data to HDTV 4, preferably using one of the standard digital formats or protocols now being established. No general purpose computer need be coupled between external drive 10 and HDTV 4, although such a general purpose computer may be incorporated into video system 2 to allow flexible manipulation of the video data. In the exemplary embodiment, external drive 10 is less than 2 in. by less than 5½ in. by less than 7 in. The small size of the drive (and the small size of the disks on which the movies are stored) helps decrease the overall space which is required for video systems and the associated movie library.

Figure 1A:
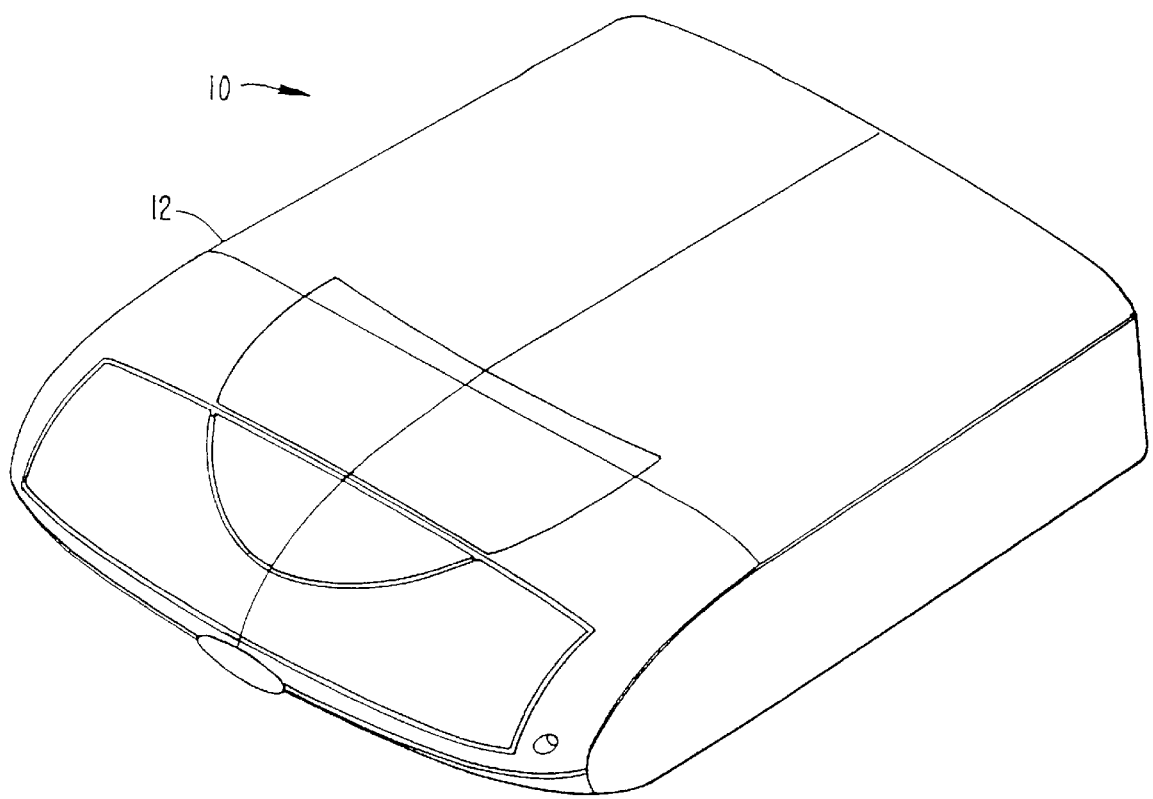
FIG. 1A is a perspective view of an external disk drive for use with a removable rigid recording disk cartridge, according to the principles of the present invention.
Figure 1B:
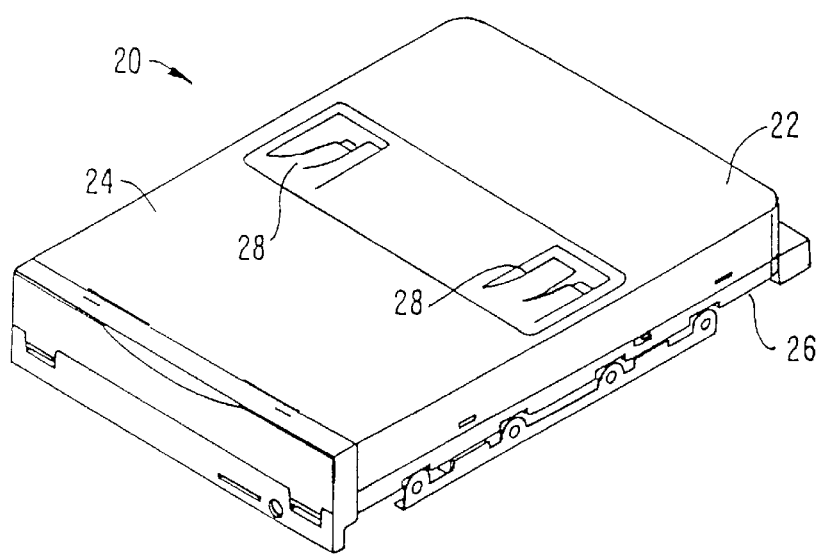
FIG. 1B is a perspective view of an internal disk drive similar to the external drive of FIG. 1, in which the internal drive is adapted for insertion into a standard bay of a computer.

Referring now to FIGS. 1A and 1B, external disk drive 10 and internal disk drive 20 will share many of the same components. However, external drive 10 will include an enclosure 12 adapted for use outside a personal computer, high definition television, or some other data manipulation or display device. Additionally, external drive 10 will include standard I/O connectors, parallel ports, and/or power plugs similar to those of known computer peripheral or video devices.

Internal drive 20 will typically be adapted for insertion into a standard bay of a computer. In some embodiments, internal drive 20 may instead be used within a bay in a HDTV, thereby providing an integral video system. Internal drive 20 may optionally be adapted for use with a bay having a form factor of 2.4 inches, 1.8 inches, 1 inch, or with any other generally recognized or proprietary bay. Regardless, internal drive 20 will typically have a housing 22 which includes a housing cover 24 and a base plate 26. As illustrated in FIG. 1B, housing cover 24 will typically include integral springs 28 to bias the cartridge downward within the receiver of housing 22. It should be understood that while external drive 10 may be very different in appearance than internal drive 20, the external drive will preferably make use of base plate 26, cover 24, and most or all mechanical, electromechanical, and electronic components of internal drive 20.

Figure 2:
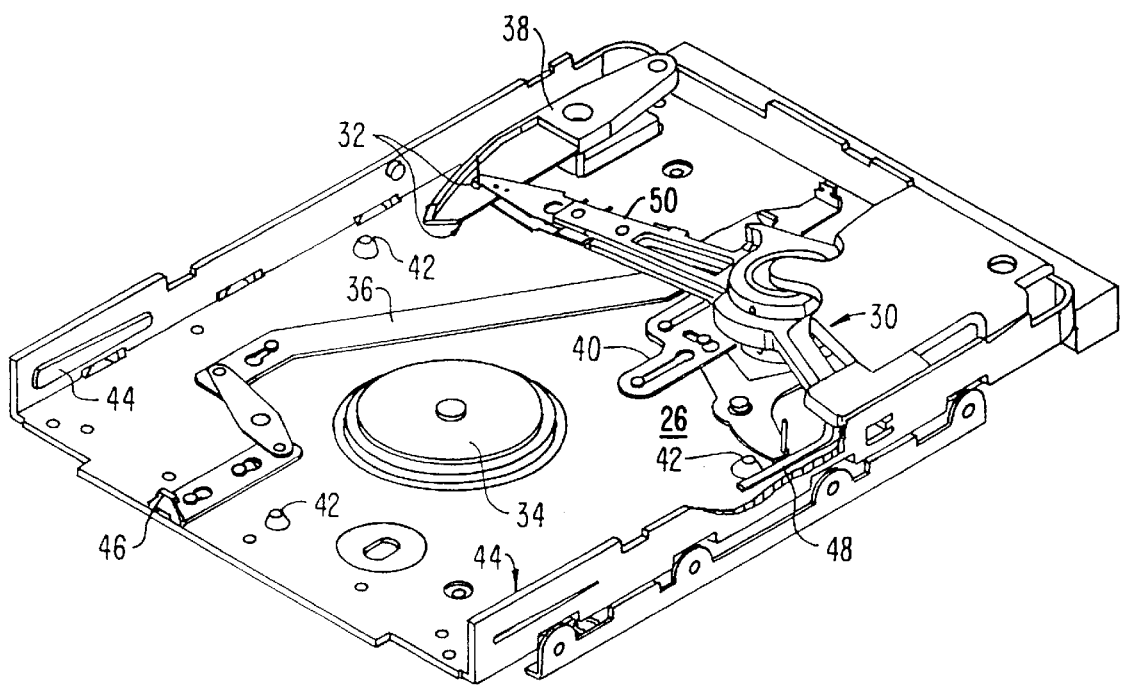
FIG. 2 is a perspective view of the internal disk drive of FIG. 1B, in which a cover of the disk drive has been removed to show a receptacle for the removable cartridge and some of the major disk drive components.

Many of the components of internal drive 20 are visible when cover 24 has been removed, as illustrated in FIG. 2. In this exemplary embodiment, a voice coil motor 30 positions first and second heads 32 along opposed recording surfaces of the hard disk while the disk is spun by spindle drive motor 34. A release linkage 36 is mechanically coupled to voice coil motor 30, so that the voice coil motor effects release of the cartridge from housing 22 when heads 32 move to a release position on a head load ramp 38. Head load ramp 38 is preferably adjustable in height above base plate 26, to facilitate aligning the head load ramp with the rotating disk.

A head retract linkage 40 helps to ensure that heads 32 are retracted from the receptacle and onto head load ramp 38 when the cartridge is removed from housing 22. Head retract linkage 40 may also be used as an inner crash stop to mechanically limit travel of heads 32 toward the hub of the disk.

Base 26 preferably comprise a steel sheet metal structure in which the shape of the base is primarily defined by stamping, the shape ideally being substantially fully defined by the stamping process. Bosses 42 are stamped into base 26 to engage and accurately position lower surfaces of the cartridge housing. To help ensure accurate centering of the cartridge onto spindle drive 34, rails 44 maintain the cartridge above the associated drive spindle until the cartridge is substantially aligned axially above the spindle drive, whereupon the cartridge descends under the influence of cover springs 28 and the downward force imparted by the user. This brings the hub of the disk down substantially normal to the disk into engagement with spindle drive 34. A latch 46 of release linkage 36 engages a detent of the cartridge to restrain the cartridge, and to maintain the orientation of the cartridge within housing 22.

Figure 3:
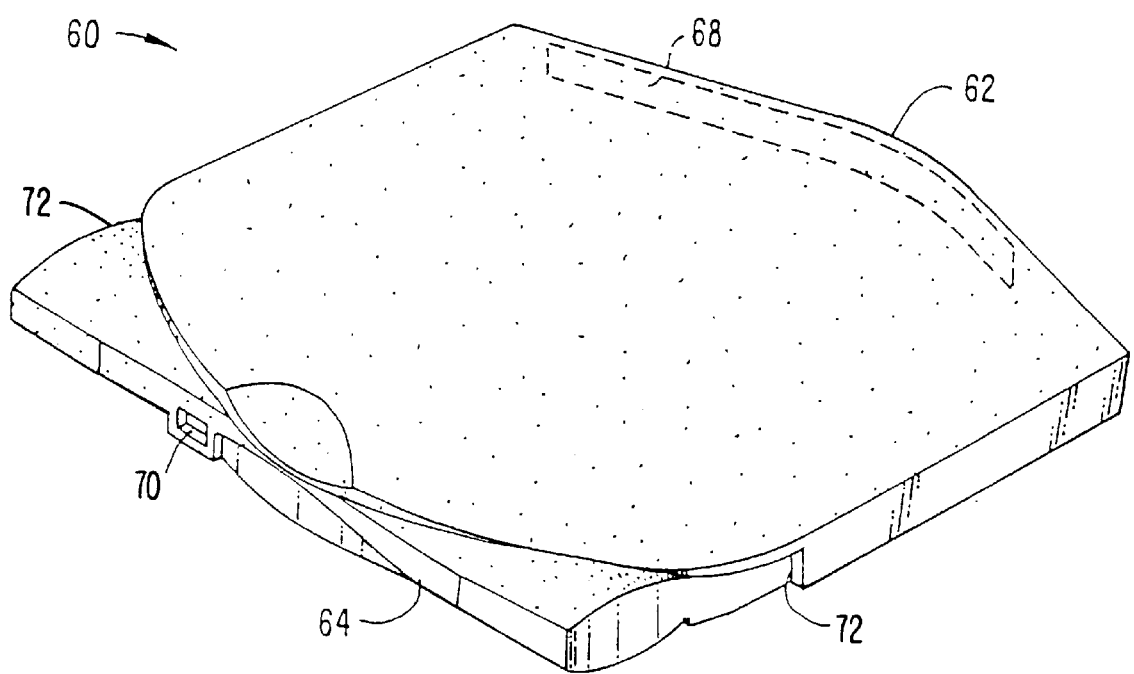
FIG. 3 is a perspective view of a removable cartridge housing a rigid magnetic recording disk.
Figure 3A:
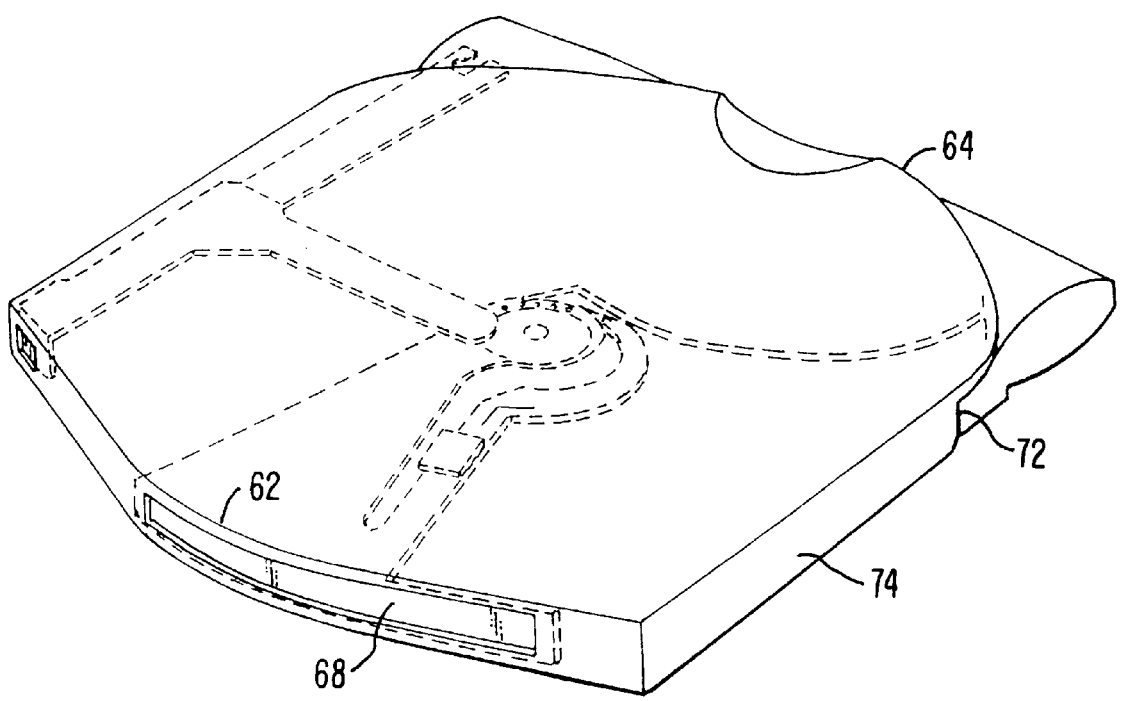
FIG. 3A is an alternative perspective view of the cartridge of FIG. 3, showing the door and door actuation mechanism.
Figure 7B:
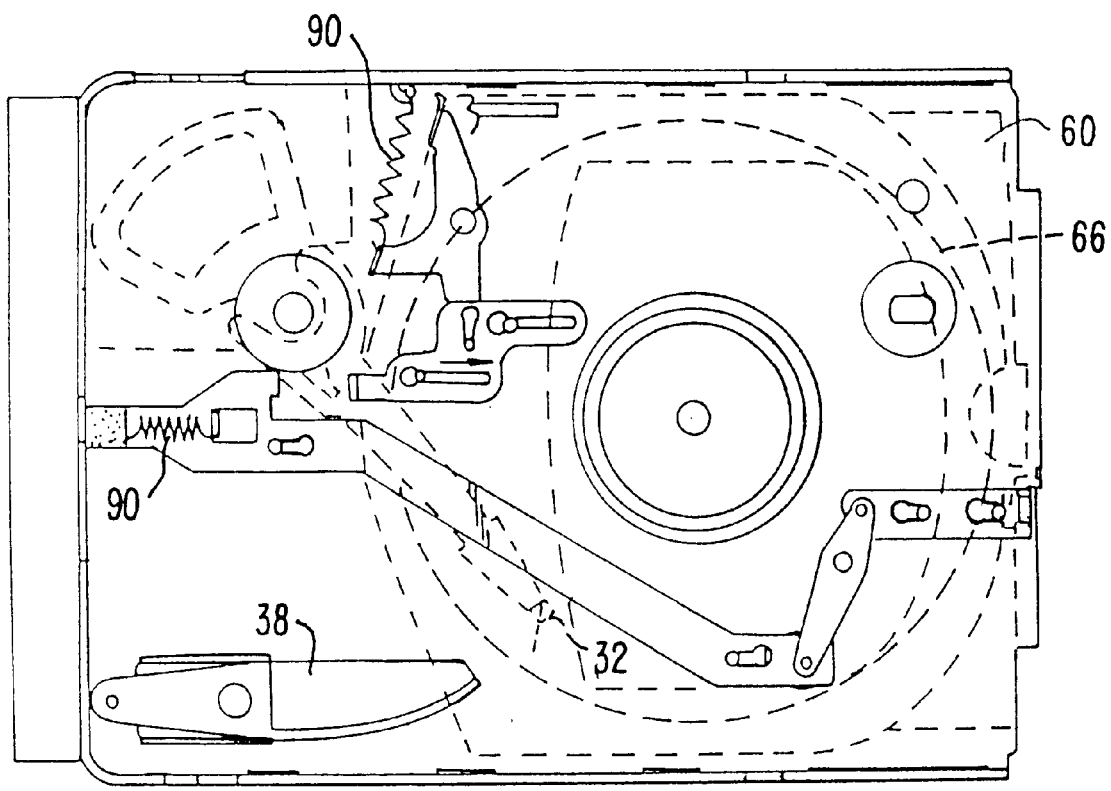
FIG. 7B is a top view of the cartridge inserted within the drive.

A cartridge for use with internal drive 20 is illustrated in FIGS. 3 and 3A. Generally, cartridge 60 includes a front edge 62 and rear edge 64. A disk 66 (see FIG. 7B) is disposed within cartridge 60, and access to the disk is provided through a door 68. A detent 70 along rear edge 64 of cartridge 60 mates with latch 46 to restrain the cartridge within the receptacle of the drive, while rear side indentations 72 are sized to accommodate side rails 44 to allow cartridge 60 to drop vertically into the receptacle. Optionally, a ridge may extend from rear edge of the cartridge to facilitate insertion and/or removal of the cartridge, and to avoid any interference between the housing surrounding the receptacle and the user's fingers. The door of the drive may include a corresponding bulge to accommodate such a ridge. An anti-rattle mechanism, ideally having a two-part arm (one portion comprising polymer molded integrally with the door, the other portion comprising a metal and extending from the polymer portion over the hub of the disk) prevents the disk from rattling within the cartridge when the cartridge is removed from the drive.

Figure 4:
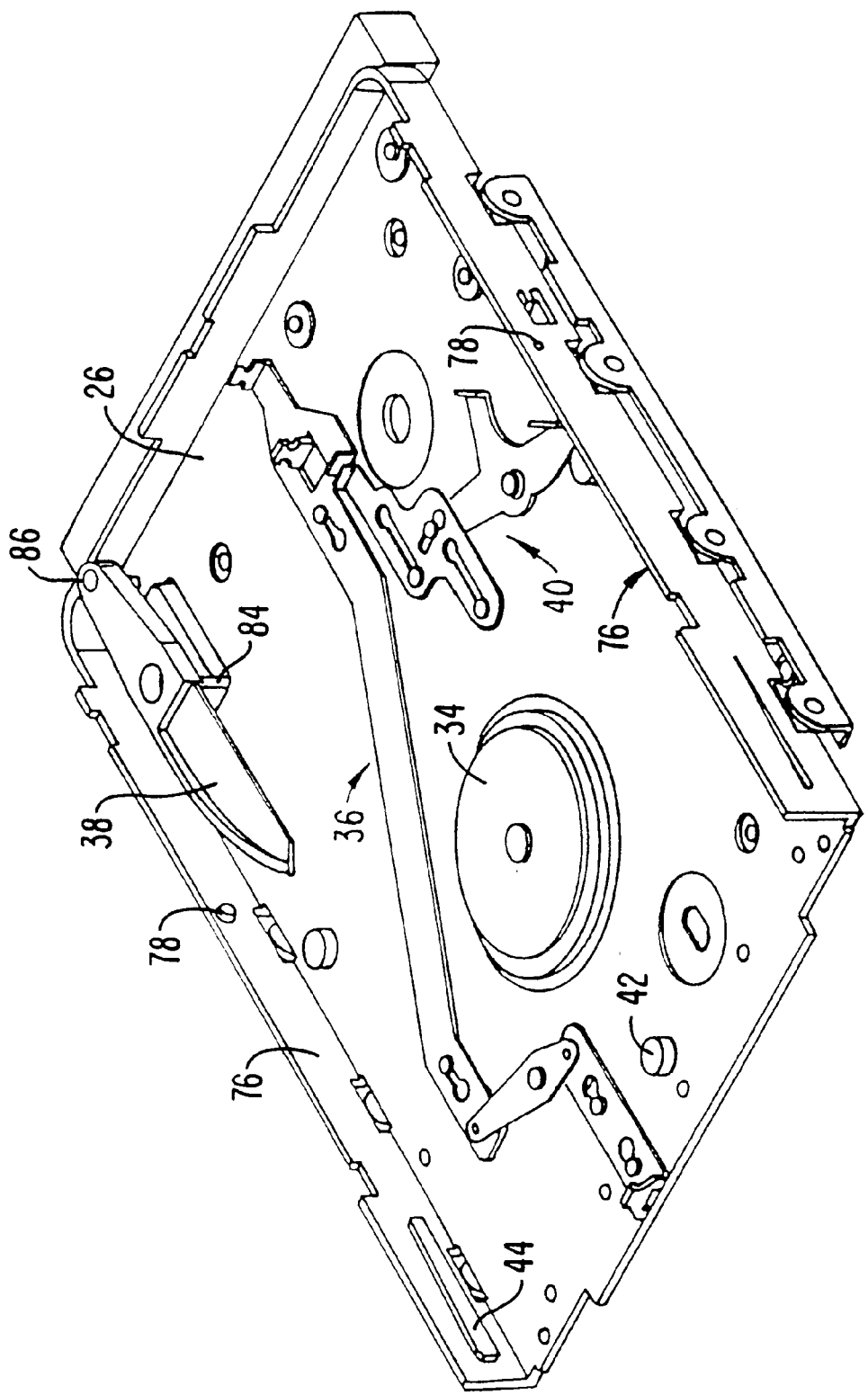
FIG. 4 is a simplified perspective view of the internal drive of FIG. 2, in which the voice coil motor and arm have been removed to show the cartridge release linkage and the head retract linkage.

Side edges 74 of cartridge 60 are fittingly received between side walls 76 of base 26, as illustrated in FIG. 4. This generally helps maintain the lateral position of cartridge 60 within base 26 throughout the insertion process. Stops 78 in sidewall 76 stop forward motion of the cartridge once the hub of disk 66 is aligned with spindle drive 34, at which point rails 44 are also aligned with rear indents 72. Hence, the cartridge drops roughly vertically from that position, which helps accurately mate the hub of the disk with the spindle drive.

Figure 5A:
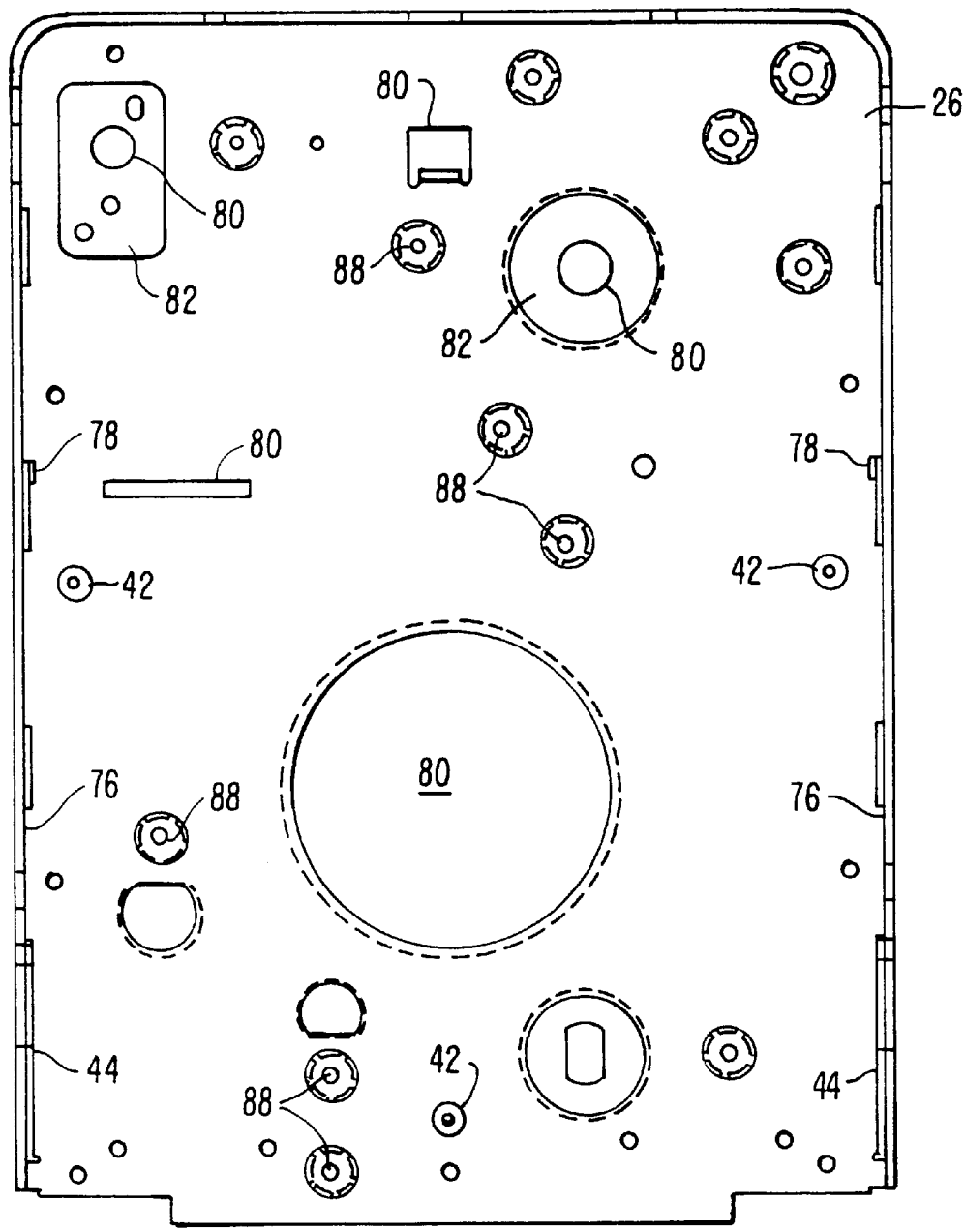
FIG. 5A is a top view of a base for the internal drive of FIG. 2, in which the base is substantially entirely formed from sheet stock in a single stamping process.
Figure 5B:
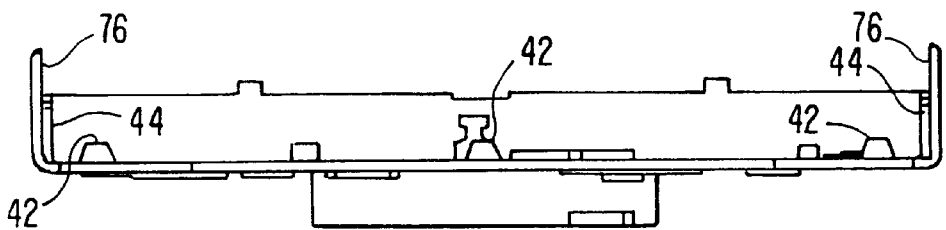
FIG. 5B is a front view of the base of FIG. 5A.
Figure 6A:
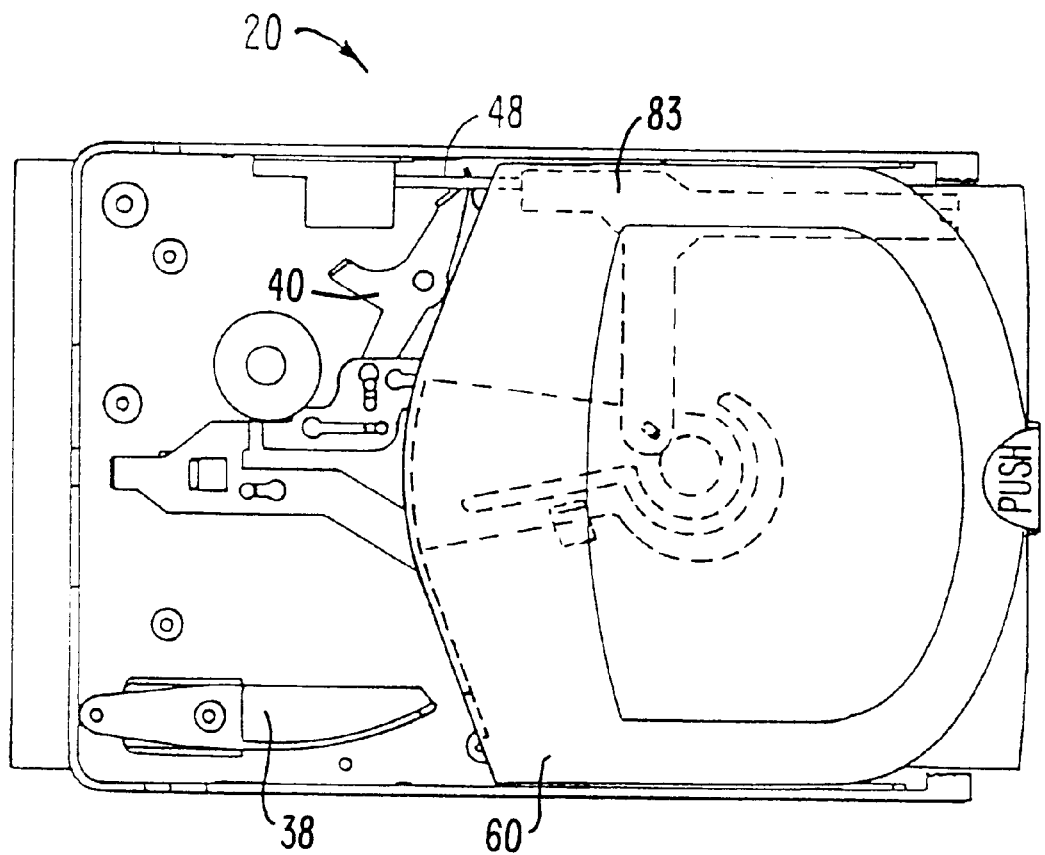
FIG. 6A is a top view of the internal drive of FIG. 1B, in which the cover has been removed to show insertion of the cartridge of FIG. 3 therein.

The structure of base 26 can be seen most clearly in FIGS. 4, 5A, and 5B. Base 26 generally comprises a stamped sheet metal structure, ideally being formed of steel. Openings 80 accommodate the spindle drive, data transmission cables, component mounting fasteners, and the like. Openings 80 are substantially formed during the stamping process, but may optionally be modified afterward to provide threaded openings, etc. Mounting pads 82 are also generally defined by the stamp tools, so that head load ramp 38, the head support structure (which generally includes voice coil motor 30 and head support arm 50, as illustrated in FIG. 2), and spindle drive 34 are substantially located relative to each other. Base plate 26 and related methods are more fully described in co-pending U.S. patent application Ser. No. 08/971,033 (Attorney Docket No. 18525-000600), filed concurrently herewith, the full disclosure of which is incorporated herein by reference.

Bosses 42 and side wall 76 are also formed by clamping the sheet metal stock between the male and female tool parts, while side rails 44 and stops 78 may be formed by independently movable tool portions. Hence, the cartridge engaging surfaces and component mounting pads are positioned on base 26 simultaneously during the relatively rapid stamping process, rather than individually machining each of these surfaces.

Once base 26 is stamped to shape, the various components may be mounted to the base to assembly the disk drive. Voice coil motor 30 and arm 50, which together support head 32 (see FIG. 2) are mounted directly to their associated pad 82. Spindle drive 34 will then be bonded to the base material which extends downward from its associated opening 80. The driving member will rotate about a fixed position, rather than telescoping axially to engage the disk within the cartridge. The position of the spindle drive assembly can be adjusted during the bonding process using a gauge to align the disk on the spindle drive with the motion of heads 32.

Head load ramp 38 is also mounted on an associated stamped pad 82 of base 26. The head load ramp will preferably flex about a central fulcrum 84. This facilitates adjustment of a height of the head load ramp over the base using a rear screw 86, as more fully described in co-pending U.S. patent application Ser. No. 08/970,282, filed concurrently herewith (Attorney Docket No. 18525-000800) and assigned to the present assignee, the full disclosure of which is incorporated herein by reference. This allows the height of the head load ramp adjacent the disk to be easily adjusted so as to smoothly transfer the heads between the recording surface and a "park" position along the head load ramp.

Also formed during the stamping process are linkage mounts 88. Release linkage 36 and head retract linkage 40 will be mounted to linkage mounts 88 using rivets or other fasteners which accommodate the sliding and/or pivoting of the linkage members, as appropriate.

Heads 32 will often be separated from the spinning recording surface by a thin layer of air. More specifically, the data transfer head often glides over the recording surface on an "air bearing," a thin layer of air which moves with the rotating disk. Although recording densities are generally enhanced by minimizing the thickness of this air bearing, often referred to as the glide height, glide heights which are too low may lead to excessive contact between the head and the disk surface, which can decrease the reliability of the recording system. To avoid a head crash (in which the data transfer head contacts and damages the disk), the disk drive system of the present system will generally position heads 32 on head load ramp 38 whenever the disk is rotating at insufficient velocity to maintain a safe glide height.

Referring now to FIGS. 6A–7B, arm 50 pivotably supports heads 32. When no cartridge is disposed in internal drive 20 and no power is supplied to voice coil motor 30, biasing springs of head retract linkage 40 and release linkage 36 urge arm 50 to a parked position on head load ramp 38. As cartridge 60 is inserted into the receptacle of internal drive 20, the cartridge actuates head retract linkage 40 so that the voice coil motor is free to pivot the arm from the parked position.

During insertion, cover springs 28 urge forward edge 62 of cartridge 60 downward, while rear edge 64 remains elevated (so long as the cartridge rides along rails 44) as cartridge 60 slides into the receiver, biasing spring 90 attached to head retract linkage 40 is tensioned. Biasing spring 90 is generally overcome manually during insertion of the cartridge.

Once cartridge 60 is inserted so that disk 66 is substantially aligned axially with spindle drive 34, rear side indentations 72 (see FIG. 3) allow rear edge 64 of the cartridge to drop downward below rails 44. This downward movement is opposed by base springs 94. These base springs generally comprise simple wire structures screwed or otherwise fastened to base 26, and the upward urging force imposed on cartridge 60 by the base springs is again manually overcome during insertion.

As base springs 94 are compressed against base 26, latch 46 slides into detent 70, so that the latch restrains cartridge 60 within the receiver of internal drive 20. Simultaneously, spindle drive 34 aligns with and engages the hub of disk 66, with centering alignment and driving engagement between the spindle drive and the disk generally being facilitated by a protruding, tapering nose on a magnetic chuck of the spindle drive and a corresponding counter sunk armature at the hub of disk 66. The door 68 of the cartridge 60 opens automatically during insertion of the cartridge through engagement between shaft 48 of the drive and a link 83 of the cartridge. Actuation of head retract linkage 40 during insertion also frees arm 50 to move heads 32 from head load ramp 38 to recording surfaces 92 along the major surfaces of disk 66.

While cartridge 60 is disposed within the receptacle of drive 20, the position of the cartridge is generally maintained by engagement between the surfaces of the cartridge and the stamped surfaces of base 26. More specifically, cover springs 28 and latch 46 hold cartridge 60 in contact with bosses 42, thereby ensuring alignment between the major surfaces of the cartridge and the disk drive structure. The fore and aft position of the cartridge is generally maintained by engagement between side rails 44 and rear indentation 72, with head retract linkage 40 biasing these two elements against each other. As described above, the sidewalls of base 26 fittingly receive side edges of cartridge 60, so that the position of the cartridge within the receptacle is substantially fully constrained. The tolerance of the positioning of the cartridge within drive 20 should be sufficient so that the disk within the cartridge is rotatable within the cartridge housing, and so that the heads (as supported by the head support structure) have free access to the recording surfaces of the disk.

As described above, cartridge 60 is held in the receiver of internal drive 20 by engagement of latch 46 with detent 70. Voice coil motor 30 may effect release of the cartridge by engagement between a tab of arm 50 and a corresponding tab on release linkage 36. Expulsion of the disk from the receptacle of internal drive 20 is effected after the disk has spun down with heads 32 safely parked along head load ramp 38. Voice coil motor 30 actuates release linkage 36 so as to disengage latch 46 from detent 70.

When the latch is disengaged, engagement between rails 44 and indents 72 initially prevents the cartridge from sliding along the plane of the disk. Instead, base springs 94 urge rear edge 64 of cartridge 60 upward, disengaging spindle drive 34 substantially axially from the hub of the disk. Once these driving structures are safely disengaged, biasing spring 90 of head retract linkage 40 urges cartridge 60 out of the receiver, and the head retract linkage also ensures that arm 50 is safely positioned with heads 32 along head load ramp 38. Generally, the biasing system will slide the cartridge rearward so that a portion of the cartridge extends from the drive, and so that the cartridge can be easily manually removed and replaced by the user.

While the exemplary embodiment has been described in some detail, by way of example and for clarity of understanding, a variety of modifications, changes, and adaptations will be obvious to those of skill in the art. Therefore, the scope of the present invention is limited solely by the appended claims.

What is claimed is:

1. A system for storing and retrieving video and other digital data, the system comprising;
    a cartridge containing a rigid recording disk, the cartridge having a plurality of positioning surfaces; and
    a housing defining a fixed receptacle which removably receives the cartridge, the receptacle including a plurality of fixed surfaces which engage the positioning surfaces of the cartridge to align the cartridge during insertion into the receptacle, wherein sliding engagement between the fixed surfaces and the positioning surfaces constrain an orientation of the cartridge to an intermediate position during insertion of the cartridge into the receptacle, wherein the fixed surfaces direct the cartridge to pivot from the intermediate position to a loaded position when the cartridge is aligned with the receptacle wherein the intermediate position is at an angle from the loaded position.

2. A system as claimed in claim 1, wherein the system is adapted for playing a movie.

3. A disk drive for use with a cartridge containing a rigid recording disk, the cartridge having a front edge, a rear edge and a plurality of positioning surfaces, the disk having a disk hub, the disk drive comprising;
    a housing defining a fixed receptacle which removably receives the cartridge, the receptacle including a plurality of fixed positioning surfaces which slidingly engage the positioning surfaces of the cartridge so that the cartridge is accurately aligned and fully constrained within the receptacle; and
    a motor having a member which drivingly engages the hub of the disk, the member adapted to rotate at a fixed position relative to the receptacle;
    wherein the fixed positioning surfaces support the rear edge of the cartridge above the receptacle when the front edge of the cartridge drops into the receptacle, wherein the positioning surfaces of the cartridge cooperate with the fixed positioning surfaces when the disk hub is aligned with the motor member to allow the rear edge of the cartridge to drop below the fixed positioning surfaces and into the receptacle.

4. A disk drive as claimed in claim 3, wherein a recording surface of the disk defines a plane, and wherein the disk drive further comprises three fixed bosses, the bosses positioned to orient the plane of the disk relative to the receptacle.

5. A disk drive as claimed in claim 4, wherein the cartridge defines an insertion axis substantially along the plane of the disk, wherein the positioning surfaces of the receptacle include a pair of fixed limit surfaces, receptacle sidewalls receive the cartridge therebetween and are spaced to align the insertion axis of the cartridge laterally relative to the receptacle, the pair of limit surfaces engageable with a corresponding surface of the cartridge to align the cartridge along the axis within the receptacle.

6. A disk drive as claimed in claim 5, further comprising a biasing system mounted to the top of the housing, the biasing system adapted to urge the cartridge against the pair of limit surfaces, and a latch which engages a detent of the cartridge to releasably latch the cartridge within the receptacle.

7. A disk drive for use with a cartridge containing a rigid recording disk, the cartridge having a plurality of positioning surfaces, the disk having a disk hub, the disk drive comprising:
 a housing defining a fixed receptacle which removably receives the cartridge, the receptacle including a plurality of fixed positioning surfaces which engage the positioning surfaces of the cartridge so that the cartridge is accurately aligned with the receptacle; and
 a motor having a member which drivingly engages the hub of the disk, the member adapted to rotate at a fixed position relative to the receptacle;
 wherein the cartridge includes a plurality of insertion surfaces, the housing including a plurality of fixed guide surfaces which slidingly engage the insertion surfaces of the cartridge when the cartridge is manually inserted into the receptacle;
 wherein a recording surface of the disk defines a plane, and wherein the guide surfaces of the housing direct the cartridge substantially along the plane to an intermediate position, the hub of the disk at the intermediate position being substantially aligned with and separated from the member, the guide surfaces directing the cartridge between the intermediate position and to a final position, wherein the final position is at an angle from the intermediate position.

8. A disk drive as claimed in claim 7, further comprising a biasing system mounted to the housing, the biasing system adapted to urge the cartridge against the guide surfaces of the drive.

9. A disk drive as claimed in claim 8, wherein the member comprises a magnetic chuck, wherein a second biasing system includes a spring urging the cartridge out of the receptacle, and wherein a latch is adapted to engage a detent of the cartridge to releasably restrain the cartridge in the receptacle.

10. A video system for retrieving and recording digital data, the video system having a cartridge containing a recording disk, the cartridge having a forward edge and a rear edge and a plurality of positioning surfaces, the disk having a disk hub, the video system comprising:
 a housing defining a fixed receptacle for receiving the cartridge;
 a spindle drive affixed relative to the receptacle;
 rails mounted to the housing above the receptacle, the rails maintaining the cartridge above the spindle drive, the rails slidably engaging corresponding positioning surfaces on the cartridge to support the rear edge of the cartridge above the receptacle and the hub separated from the spindle drive until the disk hub is aligned with the spindle drive; and
 biasing cover springs mounted to the top of the housing, the biasing springs directing the front edge of the cartridge downward into the receptacle and the hub downward toward the spindle drive while the rear edge of the cartridge is maintained above the receptacle by the rails.

11. The video system as claimed in claim 10, wherein the receptacle comprises constraint surfaces positioned to fittingly receive the cartridge so that the cartridge within the receptacle is substantially fully constrained.

12. The video system as claimed in claim 11, wherein the constraint surfaces further comprise a plurality of bosses for engaging the positioning surfaces of the cartridge, the bosses accurately positioning the cartridge in the receptacle, wherein the cover springs hold the cartridge in contact with the bosses to ensure alignment of the cartridge.

13. The video system as claimed in claim 10, wherein the video system comprises stops for limiting the forward motion of the cartridge once the disk is aligned with the spindle drive.

14. The video system as claimed in claim 10, the video system comprising biasing base springs mounted on the housing to urge the rear edge of the cartridge upward and out of the receptacle.

* * * * *

UNITED STATES PATENT AND TRADEMARK OFFICE
CERTIFICATE OF CORRECTION

PATENT NO. : 6,028,736
DATED : February 22, 2000
INVENTOR(S) : Iftikar et al

It is certified that error appears in the above-identified patent and that said Letters Patent is hereby corrected as shown below:

IN THE DRAWINGS:

In Fig. 7A, please delete the instance of reference numeral "72", indicating a detent into which latch 46 slides, and substitute therefor reference numeral --7-- indicating said detent.

Signed and Sealed this

Twenty-seventh Day of February, 2001

Attest:

NICHOLAS P. GODICI

Attesting Officer

Acting Director of the United States Patent and Trademark Office